US012586773B2

(12) United States Patent
Lee et al.

(10) Patent No.: US 12,586,773 B2
(45) Date of Patent: Mar. 24, 2026

(54) POWDER FOR ELECTRODE FOR MANUFACTURING DRY ELECTRODE FOR SECONDARY BATTERY, METHOD FOR PREPARING THE SAME, METHOD FOR MANUFACTURING DRY ELECTRODE USING THE SAME, DRY ELECTRODE, SECONDARY BATTERY INCLUDING THE SAME, ENERGY STORAGE APPARATUS

(71) Applicant: LG Energy Solution, Ltd., Seoul (KR)

(72) Inventors: Nam-Jeong Lee, Daejeon (KR);
Sang-Min Kwak, Daejeon (KR);
Ki-Seok Lee, Daejeon (KR);
Koo-Seung Chung, Daejeon (KR);
Dong-Oh Shin, Daejeon (KR);
Kwang-Ho Yoo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 73 days.

(21) Appl. No.: 18/033,096

(22) PCT Filed: Oct. 21, 2021

(86) PCT No.: PCT/KR2021/014864
§ 371 (c)(1),
(2) Date: Apr. 21, 2023

(87) PCT Pub. No.: WO2022/086247
PCT Pub. Date: Apr. 28, 2022

(65) Prior Publication Data
US 2024/0014367 A1     Jan. 11, 2024

(30) Foreign Application Priority Data

Oct. 21, 2020     (KR) ........................ 10-2020-0136913

(51) Int. Cl.
*H01M 4/62* (2006.01)
*H01M 4/02* (2006.01)
*H01M 4/04* (2006.01)

(52) U.S. Cl.
CPC ........... *H01M 4/04* (2013.01); *H01M 4/0404* (2013.01); *H01M 4/0435* (2013.01);
(Continued)

(58) Field of Classification Search
None
See application file for complete search history.

(56) References Cited

U.S. PATENT DOCUMENTS 5,654,114 A     8/1997  Kubota et al.
6,428,841 B1    8/2002  Iijima et al.
(Continued)

FOREIGN PATENT DOCUMENTS

CN        110476282 A     11/2019
EP         3483952 A1      5/2019
(Continued)

OTHER PUBLICATIONS

International Search Report for PCT/KR2021/014864 mailed Feb. 3, 2022. 3 pages.
(Continued)

*Primary Examiner* — Tracy M Dove
(74) *Attorney, Agent, or Firm* — Lerner David LLP

(57) ABSTRACT

A powder for an electrode for manufacturing a dry electrode for a secondary battery, including an active material, a conductive material and a binder, and showing a resistivity of 700 Ω·cm or less when being pressurized under a pressure of 50 MPa. The present disclosure also relates to a method for preparing the powder for an electrode, a method for manufacturing a dry electrode using the powder for an
(Continued)

15.0kV 9.4mm×1.00k SE(M)                    50.0μm electrode, a dry electrode, a secondary battery including the dry electrode, an energy storage apparatus.

5 Claims, 4 Drawing Sheets

(52) U.S. Cl.
CPC .......... *H01M 4/623* (2013.01); *H01M 4/625* (2013.01); *H01M 2004/021* (2013.01)

(56) References Cited

U.S. PATENT DOCUMENTS

| | | | |
|---|---|---|---|
| 7,791,861 B2 | 9/2010 | Zhong et al. | |
| 8,318,357 B2 | 11/2012 | Sugaya et al. | |
| 8,815,443 B2 | 8/2014 | Mitchell et al. | |
| 2002/0136948 A1 | 9/2002 | Missling et al. | |
| 2005/0266298 A1 | 12/2005 | Mitchell et al. | |
| 2007/0020514 A1 | 1/2007 | Ozaki et al. | |
| 2010/0276217 A1 | 11/2010 | Sugaya et al. | |
| 2011/0151327 A1 | 6/2011 | Imanari | |
| 2015/0357648 A1 | 12/2015 | Sugimoto et al. | |
| 2016/0260975 A1* | 9/2016 | Ishigaki | H01M 4/13 |
| 2017/0256367 A1 | 9/2017 | Raman et al. | |
| 2019/0036164 A1* | 1/2019 | Matsuzaki | H01M 4/134 |
| 2019/0097214 A1 | 3/2019 | Yamaya et al. | |
| 2019/0148734 A1 | 5/2019 | Yamashita et al. | |
| 2020/0013563 A1 | 1/2020 | Zhong et al. | |
| 2020/0136167 A1 | 4/2020 | Park et al. | |
| 2020/0152967 A1 | 5/2020 | Duong et al. | |
| 2020/0168895 A1 | 5/2020 | Kim et al. | |
| 2020/0227723 A1 | 7/2020 | Wang et al. | |
| 2020/0235424 A1 | 7/2020 | Mochizuki et al. | |
| 2020/0321599 A1* | 10/2020 | Kim | H01M 4/0471 |
| 2021/0399306 A1* | 12/2021 | Nakano | H01G 11/38 |

FOREIGN PATENT DOCUMENTS

| | | | |
|---|---|---|---|
| JP | S5543766 A | 3/1980 |
| JP | H0594820 A | 4/1993 |
| JP | H10149828 A | 6/1998 |
| JP | 2005032584 A | 2/2005 |
| JP | 2005063846 A | 3/2005 |
| JP | 2007026984 A | 2/2007 |
| JP | 2019091539 A | 6/2019 |
| JP | 2020509558 A | 3/2020 |
| JP | WO 2019074076 A1 | 10/2020 |
| JP | 2022506188 A | 1/2022 |
| KR | 20040007445 A | 1/2004 |
| KR | 20060025230 A | 3/2006 |
| KR | 20150114463 A | 10/2015 |
| KR | 20190035579 A | 4/2019 |
| KR | 20190037060 A | 4/2019 |
| KR | 20190038163 A | 4/2019 |
| KR | 20190124038 A | 11/2019 |
| WO | 2019222110 A1 | 11/2019 |
| WO | 2020036055 A1 | 2/2020 |
| WO | 2020097322 A1 | 5/2020 |
| WO | 2020150240 A1 | 7/2020 |

OTHER PUBLICATIONS

Office Action for Korean Application No. 10-2021-0141424 issued Sep. 18, 2023. 9 pgs.

Notice of Allowance for Korean Application No. 10-2021-0141424 issued May 11, 2024. 2 pgs.

Extended European Search Report including Written Opinion for Application No. 21883315.0 dated Feb. 10, 2025. 11 pages.

Search Report dated Aug. 20, 2025 from the Office Action for Chinese Application No. 202180071876.3 issued Aug. 21, 2025, pp. 1-3.

* cited by examiner

Prior Art 5.0kV 9.8mm×1.00k SE(M)                    50.0μm

POWDER FOR ELECTRODE FOR MANUFACTURING DRY ELECTRODE FOR SECONDARY BATTERY, METHOD FOR PREPARING THE SAME, METHOD FOR MANUFACTURING DRY ELECTRODE USING THE SAME, DRY ELECTRODE, SECONDARY BATTERY INCLUDING THE SAME, ENERGY STORAGE APPARATUS

CROSS-REFERENCE TO RELATED APPLICATIONS

The present application is a national phase entry under 35 U.S.C. § 371 of International Application No. PCT/KR2021/014864 filed on Oct. 21, 2021 which claims priority from Korean Patent Application No. 10-2020-0136913 filed on Oct. 21, 2020, all of which are incorporated herein by reference.

TECHNICAL FIELD

The present disclosure relates to powder for manufacturing a dry electrode for a secondary battery, a method for preparing the same, a method for manufacturing a dry electrode using the same, a dry electrode, a secondary battery including the same, an energy storage apparatus, and an apparatus for manufacturing a dry electrode.

BACKGROUND ART

Due to a rapid increase in use of fossil fuel, there has been an increasing need for use of substitute energy and clean energy. The most actively studied field as a part of attempts to meet such a need is the field of power generation and power storage using electrochemistry.

Currently, typical examples of electrochemical devices using electrochemical energy include secondary batteries, and application thereof has been extended gradually.

A lithium secondary battery as a representative of such secondary batteries has been used not only as an energy source of mobile devices but also as a power source of electric vehicles and hybrid electric vehicles capable of substituting for vehicles, such as gasoline vehicles and diesel vehicles, using fossil fuel and regarded as one of the main causes of air pollution, recently. In addition, application of such a lithium secondary battery has been extended even to a supplementary power source of electric power through the integration into a grid.

A process of manufacturing such a lithium secondary battery is broadly divided into an electrode manufacturing step, an assemblage step and an aging step. The electrode manufacturing step is further divided into an active material mixing step, a coating step, a drying step, a pressing step, a slitting step, a winding step, or the like.

Among the steps, the active material mixing step is a step of mixing the coating ingredients for forming an electrode active layer configured to carry out electrochemical reactions actually in the electrode. Particularly, an electrode active material as an essential element of the electrode is mixed with other additives, including a conductive material, a filler, a binder used for the binding of powder particles among themselves and the adhesion to a current collector, a solvent for imparting viscosity and dispersing powder, or the like, to prepare slurry having flowability.

The composition mixed for forming an electrode active layer as mentioned above is also called 'electrode mixture' in a broad sense.

Then, an electrode coating step of applying the electrode mixture onto an electroconductive current collector and a drying step of removing the solvent contained in the electrode mixture are carried out, and the electrode is further pressed to provide an electrode having a predetermined thickness.

Meanwhile, as the solvent contained in the electrode mixture evaporates during the drying step, defects, such as pinholes or cracks, may be generated in the preliminarily formed electrode active layer. In addition, the electrode active layer is not dried uniformly at the internal part and external part thereof, and thus a powder floating phenomenon may occur due to a difference in solvent evaporation rate. In other words, powder present in a portion dried earlier may float, while forming a gap from a portion dried relatively later, resulting in degradation of electrode quality.

Therefore, to solve the above-mentioned problems, there has been considered a drying apparatus which allows uniform drying of the internal and external parts of an electrode active layer and can control the evaporation rate of a solvent. However, such drying apparatuses are expensive and require a lot of costs and times for their operation, and thus are disadvantageous in terms of manufacture processability.

Therefore, recently, active studies have been conducted to manufacture a dry electrode without using any solvent.

In general, the dry electrode is obtained by laminating a free-standing film, including an active material, a binder and a conductive material and prepared in the form of a film, onto a current collector.

The step of manufacturing a dry electrode according to the related art is shown schematically in FIG. 1.

Referring to FIG. 1, first, an active material, a carbonaceous material as a conductive material and a binder capable of fibrilization are mixed by using a blender, the binder is fibrillized through a high-shear mixing process, such as jet milling, and then the resultant mixture is subjected to calendering to form a film shape, thereby providing a free-standing film. Then, the free-standing film obtained after the calendering is laminated onto a current collector to obtain a dry electrode.

However, when the active material having brittleness is subjected to such a high-shear mixing process, a large amount of fine powder having a small powder size is formed to cause degradation of mechanical or electrochemical performance. In addition, when such high-shear mixing is carried out excessively, the resultant binder fibers may be cut to cause degradation of the flexibility of the free-standing film. In addition, the ingredients may be adhered to the inner part of the device during the jet-milling process to cause the problem of blocking of a flow path, for example, by interrupting the flow of high-pressure air, which is not amenable to mass production.

Therefore, there is an imminent need for developing techniques for manufacturing a dry electrode which can solve the above-mentioned problems.

DISCLOSURE

Technical Problem

The present disclosure is designed to solve the problems of the related art, and therefore the present disclosure is directed to providing powder for a dry electrode which shows minimized micronization of an active material and maximized binder fibrilization, and a method for preparing the same.

The present disclosure is also directed to providing a method for manufacturing a dry electrode which provides an electrode with improved mechanical performance and is amenable to mass production by using the powder for a dry electrode.

Further, the present disclosure is directed to providing a dry electrode obtained by the method, a secondary battery including the dry electrode, and an apparatus for manufacturing the dry electrode.

Technical Solution

In one aspect of the present disclosure, there is provided powder for an electrode according to any one of the following embodiments.

According to the first embodiment, there is provided powder for an electrode which can be formed into a film for manufacturing a dry electrode for a secondary battery, includes an active material, a conductive material and a binder, and showing a resistivity of 700 $\Omega \cdot cm$ or less when being pressurized under a pressure of 50 MPa.

According to the second embodiment, there is provided a method for preparing the powder for an electrode as defined in the first embodiment, including the steps of: (a) preparing a mixture including an active material, a conductive material and a binder; (b) kneading the mixture at a temperature ranging from 70° C. to 200° C. under a pressure equal to or higher than ambient pressure so that the binder may be fibrillized, thereby providing mixture lumps; and (c) pulverizing the mixture lumps to obtain powder for an electrode.

According to the third embodiment, there is provided the method for preparing the powder for an electrode as defined in the second embodiment, wherein the conductive material includes at least one selected from the group consisting of activated carbon, graphite, carbon black and carbon nanotubes.

According to the fourth embodiment, there is provided the method for preparing the powder for an electrode as defined in the second or the third embodiment, wherein the binder includes polytetrafluoroethylene (PTFE), polyolefin or a mixture thereof.

According to the fifth embodiment, there is provided the method for preparing the powder for an electrode as defined in any one of the second to the fourth embodiments, wherein the kneading in step (b) is carried out at a rate of 10-100 rpm for 1-30 minutes.

According to the sixth embodiment, there is provided the method for preparing the powder for an electrode as defined in any one of the second to the fifth embodiments, wherein the kneading in step (b) is carried out at a shear rate of 10/s-500/s for 1-30 minutes.

According to the seventh embodiment, there is provided the method for preparing the powder for an electrode as defined in any one of the second to the sixth embodiments, wherein the kneading in step (b) is carried out at 90-180° C.

According to the eighth embodiment, there is provided the method for preparing the powder for an electrode as defined in any one of the second to the seventh embodiments, wherein the kneading in step (b) is carried out under a pressure of 1-60 atm.

According to the ninth embodiment, there is provided the method for preparing the powder for an electrode as defined in any one of the second to the eighth embodiments, wherein the pulverizing in step (c) is carried out at a rate of 500-20,000 rpm for 30 seconds to 10 minutes.

According to the tenth embodiment, there is provided the method for preparing the powder for an electrode as defined in any one of the second to the ninth embodiments, which further includes a step of classifying the pulverized powder for an electrode, after step (c) of pulverizing the mixture lumps to obtain the powder for an electrode.

In another aspect of the present disclosure, there is provided a method for manufacturing a dry electrode according to any one of the following embodiments.

According to the eleventh embodiment, there is provided a method for manufacturing a dry electrode, including the steps of: (d) calendering the powder for an electrode as defined in any one of the second to the tenth embodiments to obtain a mixture film; and (e) disposing the mixture film on at least one surface of a current collector and carrying out lamination.

According to the twelfth embodiment, there is provided the method for manufacturing a dry electrode as defined in the eleventh embodiment, wherein the mixture film has a porosity of 20-35%.

According to the thirteenth embodiment, there is provided the method for manufacturing a dry electrode as defined in the eleventh or the twelfth embodiment, wherein the dry electrode has a flexing resistance of less than 10 mmφ.

According to the fourteenth embodiment, there is provided the method for manufacturing a dry electrode as defined in any one of the eleventh to the thirteenth embodiments, wherein the mixture film has an active material loading amount of 3-15 mAh/cm².

According to the fifteenth embodiment, there is provided the method for manufacturing a dry electrode as defined in any one of the eleventh to the fourteenth embodiments, wherein the interfacial resistance between the mixture film and the current collector is 5 $\Omega \cdot cm^2$ or less.

According to the sixteenth embodiment, there is provided the method for manufacturing a dry electrode as defined in any one of the eleventh to the fifteenth embodiments, wherein the current collector is partially or totally coated with a conductive primer.

In still another aspect of the present disclosure, there is provided a dry electrode according to any one of the following embodiments.

According to the seventeenth embodiment, there is provided a dry electrode obtained by the method as defined in any one of the eleventh to the sixteenth embodiments.

According to the eighteenth embodiment, there is provided a dry electrode which includes: an electrode current collector; and a mixture film disposed on the electrode current collector and including an active material, a conductive material and a binder, and has a flexing resistance of less than 10 mmφ.

According to the nineteenth embodiment, there is provided the dry electrode as defined in the eighteenth embodiment, which has a flexing resistance of 2-8 mmφ.

According to the twentieth embodiment, there is provided the dry electrode as defined in the eighteenth or the nineteenth embodiment, wherein the flexing resistance of the dry electrode is evaluated according to the test standard JIS K5600-5-1.

According to the twenty-first embodiment, there is provided the dry electrode as defined in any one of the eighteenth to the twentieth embodiments, wherein the flexing resistance of the dry electrode is evaluated by the method including the steps of:
  preparing a rectangular electrode sample having a size of 100 mm×50 mm;
  preparing test rods each having a diameter of 2, 3, 4, 5, 6, 8, 10, 12, 16, 20, 25 or 32 mm, allowing the electrode sample to be in contact with the test rod by using the test rod having the largest diameter, and judging whether the mixture film of the electrode sample causes cracking or not, when both ends of the electrode sample are lifted; and repeating the step of judging whether the mixture film of the electrode sample causes cracking or not in the same manner as the preceding step by using the test rod having the second largest diameter, when no cracking occurs in the preceding step, and then determining the minimum diameter value of the test rod by which no cracking occurs in the mixture film of the electrode sample as the flexing resistance.

According to the twenty-second embodiment, there is provided the dry electrode as defined in any one of the eighteenth to the twenty-first embodiments, wherein the mixture film has a porosity of 20-35%.

According to the twenty-third embodiment, there is provided the dry electrode as defined in any one of the eighteenth to the twenty-second embodiments, wherein the mixture film has an active material loading amount of 3-15 mAh/cm$^2$.

According to the twenty-fourth embodiment, there is provided the dry electrode as defined in any one of the eighteenth to the twenty-third embodiments, wherein the interfacial resistance between the mixture film and the current collector is 5 Ω·cm$^2$ or less.

According to the twenty-fifth embodiment, there is provided the dry electrode as defined in any one of the eighteenth to the twenty-fourth embodiments, wherein the current collector is partially or totally coated with a conductive primer.

In still another aspect of the present disclosure, there is provided a secondary battery according to the following embodiment.

According to the twenty-sixth embodiment, there is provided a secondary battery including the dry electrode as defined in any one of the seventeenth to the twenty-fifth embodiments, wherein the dry electrode is a positive electrode, and an electrode assembly including the positive electrode, a negative electrode and a separator is received in a battery casing together with a lithium-containing non-aqueous electrolyte.

In still another aspect of the present disclosure, there is provided an energy storage apparatus according to the following embodiment.

According to the twenty-seventh embodiment, there is provided an energy storage apparatus including the secondary battery as defined in the twenty-sixth embodiment as a unit cell.

In yet another embodiment of the present disclosure, there is provided an apparatus for manufacturing a dry electrode according to any one of the following embodiments.

According to twenty-eighth embodiment, there is provided an apparatus for manufacturing a dry electrode, including: a blender configured to blend mixture ingredients including an active material, a conductive material and a binder; a kneader configured to prepare mixture lumps by kneading the blended mixture in order to fibrilize the binder; a pulverizer configured to pulverize the mixture lumps to form powder for an electrode; a calender configured to form the powder for an electrode into a mixture film; and a lamination roll configured to dispose the mixture film on at least one surface of a current collector and to carry out lamination.

According to the twenty-ninth embodiment, there is provided the apparatus for manufacturing a dry electrode as defined in the twenty-eighth embodiment, wherein the kneader is set under the condition of a temperature of 70-200° C. and a pressure equal to or higher than ambient pressure.

Advantageous Effects

In the method for manufacturing powder for an electrode according to the present disclosure, a pulverization step after a high-temperature low-shear kneading step is introduced, instead of a high-shear mixing step. In this manner, it is possible to minimize micronization of an active material, to maximize binder fibrilization and to minimize cutting of a fibrillized binder.

In addition, when manufacturing a dry electrode by using the powder for an electrode, it is possible to ensure the flexibility of a dry electrode.

Further, since the method includes a kneading step using a kneader and a pulverization step, without using any high-shear jet-milling process, there is no problem of blocking of a flow path caused by aggregation of ingredients, and thus the method is amenable to mass production.

DETAILED DESCRIPTION

Figure 1:
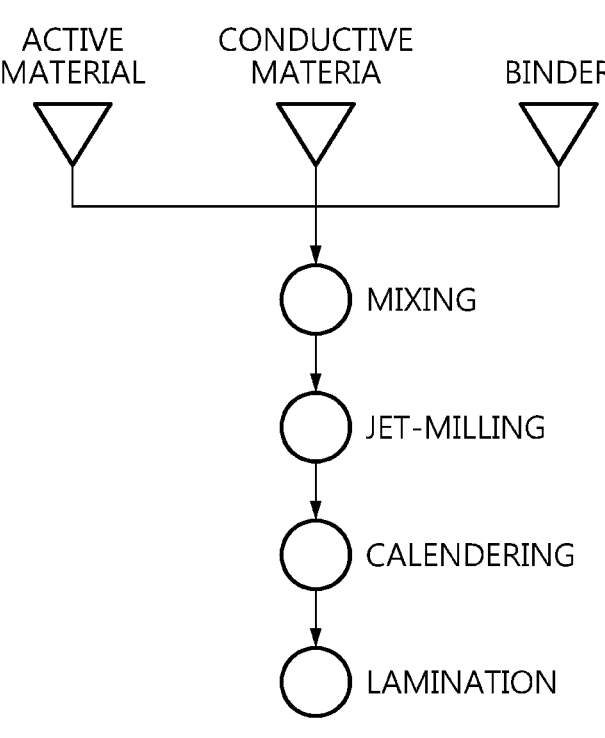
FIG. 1 is a flow chart illustrating the method for manufacturing a dry electrode for a secondary battery according to the related art.

Hereinafter, preferred embodiments of the present disclosure will be described in detail with reference to the accompanying drawings.

Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

It will be further understood that the terms "comprises" and/or "comprising", or "includes" and/or "including" when used in this specification, do not preclude the presence of other elements but specify the additional presence of other elements, unless otherwise stated.

In one aspect of the present disclosure, there is provided powder for an electrode which can be formed into a film for manufacturing a dry electrode for a secondary battery, includes an active material, a conductive material and a binder, and shows a resistivity of 700 Ω·cm or less when being pressurized under a pressure of 50 MPa.

To impart the above-mentioned characteristics, dispersion of the active material, the conductive material and the binder in the powder for an electrode should be maximized, and generation of fine powder should be minimized.

The powder for an electrode according to the present disclosure is prepared by the method as described hereinafter and shows minimized generation of fine powder, and thus shows such a low resistivity value and can be formed into a film for manufacturing a dry electrode.

When the powder for an electrode has a high resistivity beyond the above-defined range, the mixture film and the dry electrode obtained subsequently show high resistance to cause degradation of the performance of a battery undesirably.

The resistivity may be calculated by introducing 2 g of the powder for an electrode to a ceramic container having a diameter of 22 mm and including a 4-point probe embedded in the bottom thereof, measuring resistance after applying a force of 2000 kgf, i.e. after pressurizing the powder for an electrode under a pressure of about 50 MPa, and multiplying the resistance by the thickness of the pressurized powder for an electrode.

Meanwhile, in another aspect of the present disclosure, there is provided a method for preparing the powder for an electrode, including the steps of: (a) preparing a mixture including an active material, a conductive material and a binder; (b) kneading the mixture at a temperature ranging from 70° C. to 200° C. under a pressure equal to or higher than ambient pressure so that the binder may be fibrillized, thereby providing mixture lumps; and (c) pulverizing the mixture lumps to obtain powder for an electrode.

In still another aspect of the present disclosure, there is provided a method for manufacturing a dry electrode using the powder for an electrode, including the steps of: (d) calendering the powder for an electrode to obtain a mixture film; and (e) disposing the mixture film on at least one surface of a current collector and carrying out lamination to obtain a dry electrode.

Figure 2:
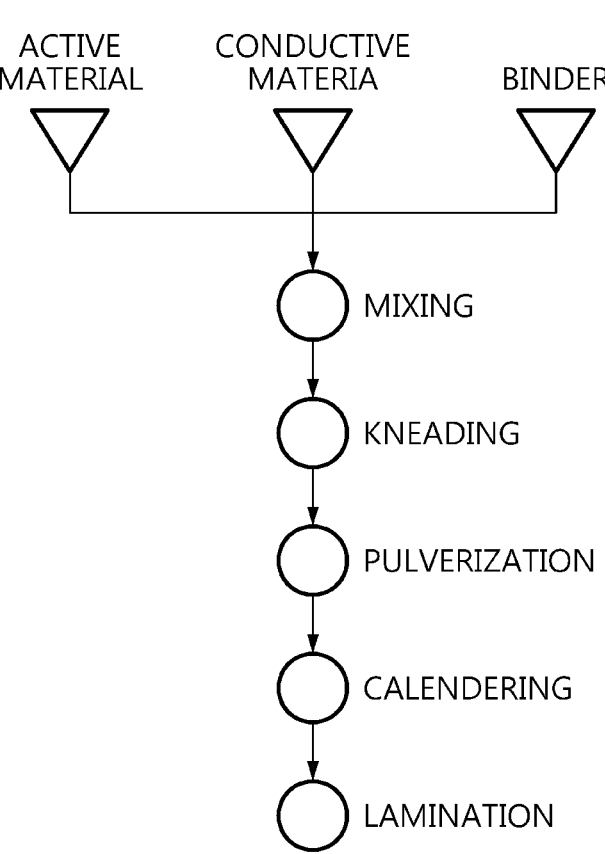
FIG. 2 is a flow chart illustrating the method for manufacturing a dry electrode for a secondary battery according to an embodiment of the present disclosure.

FIG. 2 is a schematic flow chart illustrating the method for manufacturing a dry electrode including the method for preparing powder for an electrode according to an embodiment of the present disclosure.

Referring to FIG. 2, according to an embodiment of the present disclosure, a mixture including an active material, a conductive material and a binder is firstly prepared.

Herein, since the mixing for preparing the mixture is carried out in such a manner that the active material, the conductive material and the binder may be distributed homogeneously, and the ingredients are mixed in a powder state, the mixing method is not particularly limited but various methods may be used, as long as the method allows simple mixing of the ingredients. However, since the present disclosure is directed to providing a dry electrode using no solvent, the mixing may be carried out by a dry mixing process. For example, the mixing may be carried out by introducing the ingredients to an instrument, such as a blender or a super-mixer.

In addition, the mixture may be prepared by mixing the ingredients in a mixer at 5,000-20,000 rpm for 30 seconds to 2 minutes, particularly at 10,000-15,000 rpm for 30 seconds to 1 minute in order to ensure homogeneity.

The dry electrode may be a positive electrode, and active material may be a positive electrode active material.

The positive electrode active material may include any one selected from lithium transition metal oxides, lithium metal iron phosphorus oxides and metal oxides, and is not particularly limited. Particular examples of the positive electrode active material include at least one selected from: layered compounds, such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M is Co, Ni, Fe, Cr, Zn or Ta, and x is 0.01-0.1) or $Li_2Mn_3MO_8$ (wherein M is Fe, Co, Ni, Cu or Zn); $LiMn_2O_4$ in which Li is partially substituted with an alkaline earth metal ion; lithium metal phosphorous oxides $LiMPO_4$ (wherein M is Fe, Co, Ni or Mn); disulfide compounds; $Fe_2(MoO_4)_3$; or the like. However, the scope of the present disclosure is not limited thereto.

In a variant, the dry electrode may be a negative electrode, and the active material may be a negative electrode active material.

Particular examples of the negative electrode active material include: carbon such as non-graphitizable carbon or graphite-based carbon; metal composite oxides, such as $Li_xFe_2O_3$ ($0 \leq x \leq 1$), $Li_xWO_2$ ($0 \leq x \leq 1$) and $Sn_xMe_{1-x}Me'_yO_z$ (Me: Mn, Fe, Pb, Ge; Me': Al, B, P, Si, elements of Group 1, 2 or 3 in the Periodic Table, halogen; $0 < x \leq 1$; $1 \leq y \leq 3$; $1 \leq z \leq 8$); lithium metal; lithium alloy; silicon-based alloy; tin-based alloy; silicon oxides, such as SiO, SiO/C and $SiO_2$; metal oxides, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; or the like.

More particularly, the dry electrode may be a positive electrode. Therefore, the active material may be a positive electrode active material, and particular examples thereof include lithium transition metal oxides, lithium nickel-manganese-cobalt oxides, lithium nickel-manganese-cobalt oxide partially substituted with other transition metals, lithium iron phosphorus oxides, or the like.

The conductive material is not particularly limited, as long as it has conductivity while not causing any chemical change in the corresponding battery. Particular examples of the conductive material include: graphite, such as natural graphite or artificial graphite; carbon black, such as carbon black, acetylene black, ketjen black, channel black, furnace black, lamp black or thermal black; conductive fibers, such as carbon fibers or metal fibers; metal powder, such as fluorocarbon, aluminum or nickel powder; conductive whisker, such as zinc oxide or potassium titanate; conductive metal oxide, such as titanium dioxide; conductive polymer such as a polyphenylene derivative; or the like. Particularly, the conductive material may include at least one selected from the group consisting of activated carbon, graphite, carbon black and carbon nanotubes, and more particularly, activated carbon, with a view to homogeneous mixing of the conductive material and improvement of conductivity.

The binder may include polytetrafluoroethylene (PTFE), polyolefin or a mixture thereof. Particularly, the binder may include polytetrafluoroethylene (PTFE).

Particularly, the binder may include polytetrafluoroethylene (PTFE) in an amount of 60 wt % or more based on the total weight of the binder.

Meanwhile, the binder may further include polyethylene oxide (PEO), polyvinylidene fluoride (PVDF), polyvinylidene fluoride-co-hexafluoropropylene (PVDF-HFP), or the like.

The mixing ratio of the active material, the conductive material and the binder may be 80-98 wt %:0.5-10 wt %:0.5-10 wt % (active material:conductive material:binder), particularly, 85-98 wt %: 0.5-5 wt %: 0.5-10 wt %.

When the binder content is excessively high beyond the above-defined range, the binder may be fibrillized excessively during the subsequent kneading step, thereby adversely affecting the overall process. When the binder content is excessively low, it is not possible to carry out sufficient fibrilization, and thus the ingredients cannot be aggregated to such a degree that the ingredients form mixture lumps, the mixture film is manufactured poorly, or the physical properties of the mixture film is degraded undesirably.

In addition, when the content of the conductive material is excessively high beyond the above-defined range, the content of the active material is reduced relatively, resulting in a decrease in capacity, or the physical properties of the mixture film is degraded undesirably. When the content of the conductive material is excessively low, sufficient conductivity cannot be ensured.

Meanwhile, a filler as an ingredient for inhibiting electrode swelling may be further introduced optionally to the mixture. The filler is not particularly limited, as long as it is a fibrous material, while not causing any chemical change in the corresponding battery. Particular examples of the filler include: olefinic polymers, such as polyethylene or polypropylene; fibrous materials, such as glass fibers or carbon fibers; or the like.

After preparing the mixture as described above, a step of fibrillizing the binder in the mixture is carried out.

According to the related art, high-shear mixing, such as mixing in a jet-mill, was carried out to fibrillized a binder resin. However, in this case, there are problems in that an active material is micronized by the high-shear mixing, and the resultant fibers may be cut. Therefore, according to the present disclosure, a low-shear kneading process is used instead of high-shear mixing to solve the problems.

The kneading process is not particularly limited. According to an embodiment of the present disclosure, the kneading may be carried out by using a kneader.

The kneading step is configured to bind or interconnect the active material and conductive material powder particles, while the binder is fibrillized, so that mixture lumps having a solid content of 100% may be formed.

Particularly, the kneading in step (b) may be carried out at a rate of 10-100 rpm for 1-30 minutes, particularly at a rate of 25-50 rpm for 3-7 minutes. Herein, the kneading be carried out at a shear rate of 10/s-500/s for 1-30 minutes. More particularly, the kneading may be carried out at a shear rate of 30/s-100/s.

In addition, the kneading step may be carried out at high temperature under a pressure condition equal to or higher than ambient pressure, particularly, under a pressure condition higher than ambient pressure.

More particularly, the kneading may be carried out at 70-200° C., particularly 90-180° C., or 90-150° C.

When the kneading is carried out at a low temperature beyond the above-defined temperature range, it is not possible to perform fibrilization of the binder during the kneading and lump formation through the kneading sufficiently. As a result, it is not possible to form a film with ease during calendering. On the other hand, when the kneading is carried out at an excessively high temperature, the binder may be fibrillized rapidly, and then the resultant fibers may be cut by excessive shear force, undesirably.

In addition, the kneading may be carried out under a pressure equal to or higher than ambient pressure, particularly 1-60 atm, 1-30 atm, 1-10 atm, 1-3 atom, or 1.1-3 atm.

When the kneading is carried out under an excessively high pressure beyond the above-defined pressure range, there are problems in that the resultant fibers may be cut due to the application of excessive shear force and pressure, and the mixture lumps may have excessively increased density, undesirably.

In other words, according to the present disclosure, it is possible to accomplish desired effects, when a low-shear mixing step is carried out at high temperature under a pressure condition equal to or higher than ambient pressure, instead of high-shear mixing.

Then, the mixture lumps obtained from the kneading step are pulverized to obtain powder for an electrode.

Particularly, the mixture lumps prepared through the kneading may be directly subjected to calendering. However, in this case, it is required to press the mixture lumps under strong pressure at high temperature to convert them into a thin film. As a result, there are problems in that the film may have excessively high density, or a uniform film cannot be obtained. Therefore, according to the present disclosure, the mixture lumps are subjected to a pulverization step.

Herein, the pulverization step may be carried out by using a known pulverizing instrument, including a blender or a grinder, such as a cuter mill or a fine impact mill, but is not limited thereto. Particularly, the pulverization step may be carried out at a rate of 500-20,000 rpm for 30 seconds to 10 minute, particularly at a rate of 1,000-10,000 rpm for seconds to 1 minute.

When the pulverization is carried out at an excessively low rpm or for an excessively short time beyond the above-defined ranges, it is not possible to carry out pulverization sufficiently, resulting in the problem of generation of powder having a size inadequate to form a film. When the pulverization is carried out at an excessively high rpm or for an excessively long time, a lot of fine powder may be generated from the mixture lumps undesirably.

According to an embodiment of the present disclosure, after step (c) of pulverizing the mixture lumps to obtain powder for an electrode, the method may further include a step of classifying the pulverized powder for an electrode. In the classification step, the pulverized powder for an electrode may be sieved by using a mesh having a sieve scale smaller than a predetermined size to screen powder for an electrode having a predetermined size or more.

In this manner, powder for an electrode is obtained. Then, a dry electrode is manufactured by using the powder for an electrode.

Particularly, the powder for an electrode obtained by finishing the pulverization step is subjected to calendering to obtain a mixture film.

The calendering refers to processing the powder for an electrode into a film shape. For example, the calendering step may be a step of pressing the powder for an electrode into a film shape having an average thickness of 50-300 μm.

Herein, for example, the calendering may be carried out by using rolls facing each other. Herein, the rolls may have a temperature of 50-200° C., and the calendaring may be carried out at a roll rotation rate of 10-50 rpm.

Once the calendaring step is finished, a mixture film functioning as an electrode mixture may be obtained. Such a mixture film is also referred to as 'free-standing film' according to the related art.

The resultant mixture film contains no solvent, and thus shows little flowability. Thus, the mixture film may be handled with ease and may be processed into a desired shape to be used for manufacturing various types of electrodes. In addition, when using the electrode mixture according to the present disclosure to manufacture an electrode, a drying step for removing a solvent may be eliminated. Therefore, it is possible to significantly improve the electrode manufacturing processability, and to solve the problems, such as micronization of an active material or cutting of a fibrilized binder, occurring in the method for manufacturing a dry electrode according to the related art.

In addition, according to an embodiment of the present disclosure, a lamination step of forming the mixture film on at least one surface of a current collector is carried out after the calendaring.

The lamination step may be a step of pressing and attaching the mixture film onto the current collector to a desired thickness.

The lamination may be carried out by using a lamination roll, wherein the lamination roll may be maintained at a temperature ranging from room temperature (25° C.) to 200° C.

After finishing the lamination, the mixture film in the dry electrode may have a porosity of 20-35%, 22-30%, 20-28%, 20-26%, 23.1-27.4%, 23.1-24.8%, or 24.8-27.4%. The porosity may vary slightly depending on what effect the dry electrode focuses on.

However, when the porosity satisfies the above-defined range, there are provided various advantages. When the porosity is excessively low beyond the above-defined range, it is difficult to impregnate the mixture film with an electrolyte, which is not preferred in terms of life and output characteristics. When the porosity is excessively high, the volume of the mixture film required for realizing the same capacity is increased, which is not preferred in terms of energy density per unit volume.

The porosity may be obtained by subtracting the volume and weight of the current collector from the volume and weight of the electrode to measure the apparent density of the mixture film alone, and calculating the porosity according to the following formula by using the actual density calculated based on the actual density and composition of each ingredient:

$$\text{Porosity (\%)} = \{1 - (\text{Apparent density/Actual density})\} \times 100$$

In addition, the dry electrode obtained as described above may have a flexing resistance of less than 10 mmφ, particularly, a flexing resistance of 8 mmφ or less, 5 mmφ or less, 2-8 mmφ, 2-5 mmφ, or 2-3 mmφ.

As described above, the dry electrode according to the present disclosure causes less cutting of the fibrilized binder, and thus can provide improved flexibility.

The flexing resistance may be determined by the test standard as defined in JIS K5600-5-1. Particularly, the flexing resistance may be determined by allowing the dry electrode to be in contact with test rods having different diameters and lifting both ends to determine whether cracking occurs or not and to determine the minimum diameter with which no cracking occurs.

According to an embodiment of the present disclosure, the flexing resistance of the dry electrode may be evaluated by the method including the steps of:

preparing a rectangular electrode sample having a size of 100 mm×50 mm;

preparing test rods each having a diameter of 2, 3, 4, 5, 6, 8, 10, 12, 16, 20, 25 or 32 mm, allowing the electrode sample to be in contact with the test rod by using the test rod having the largest diameter, and judging whether the mixture film of the electrode sample cracks or not, when both ends of the electrode sample are lifted; and repeating the step of judging whether the mixture film of the electrode sample cracks or not in the same manner as the preceding step by using the test rod having the second largest diameter, when no cracking occurs in the preceding step, and then determining the minimum diameter value of the test rod by which no cracking occurs in the mixture film of the electrode sample as the flexing resistance.

In addition, the active material loading amount of the mixture film may be 3-15 mAh/cm$^2$, particularly 4-10 mAh/cm$^2$, 4-6 mAh/cm$^2$, 4-5 mAh/cm$^2$, or 4.8-4.9 mAh/cm$^2$.

Herein, the active material loading amount is a value calculated according to the following formula:

$$\text{Active material loading amount (mAh/cm}^2) = \text{Capacity (mAh/g) of active material} \times \text{Weight ratio (wt\%) of active material in mixture film} \times \text{Weight per unit area (g/cm}^2) \text{ of mixture film}$$

Further, the interfacial resistance between the mixture film and the current collector may be 5 Ω·cm$^2$ or less, 4.3 Ω·cm$^2$ or less, 4 Ω·cm$^2$ or less, 3 Ω·cm$^2$ or less, 1.3-4.3 Ω·cm$^2$, 1.3-1.8 Ω·cm$^2$, or 1.8-4.3 Ω·cm$^2$.

Herein, the interfacial resistance is obtained through the multi-probe (MP) resistance measurement by applying an electric current of 100 μA to the electrode and calculating the resistance value between the mixture film and the current collector layer as a potential difference measured among the 46 probes.

When the interfacial resistance is excessively high beyond the above-defined range, the performance of the subsequently obtained secondary battery may be degraded undesirably.

Meanwhile, the current collector is not particularly limited, as long as it has high conductivity, while not causing any chemical change in the corresponding battery. Particular examples of the current collector include stainless steel, aluminum, nickel, titanium, baked carbon, copper or stainless steel surface-treated with carbon, nickel, titanium, silver, or the like. In addition, fine surface irregularities may be formed on the surface of the current collector to enhance the binding force with the positive electrode active material. The current collector may be used in various shapes, including a film, a sheet, a foil, a net, a porous body, a foamed body, a non-woven web, or the like.

Further, the current collector may be totally or partially coated with a conductive primer in order to reduce the surface resistance and to improve the adhesion.

Herein, the conductive primer may include a conductive material and a binder. The conductive material is not particularly limited, as long as it has conductivity, and particular examples thereof include carbonaceous materials.

The binder may include a fluorine-based binder (including PVDF and PVDF copolymers), which is soluble in a solvent, acrylic binder, aqueous binder, or the like.

In still another aspect of the present disclosure, there is provided a dry electrode obtained by the method for manufacturing a dry electrode as described above.

According to an embodiment of the present disclosure, there is provided a dry electrode which includes: an electrode current collector; and a mixture film disposed on the electrode current collector and including an active material, a conductive material and a binder, and has a flexing resistance of less than 10 mmφ.

Reference will be made to the above description about the mixture film and the current collector.

According to an embodiment of the present disclosure, the dry electrode may have a flexing resistance of less than 10 mmφ, particularly, a flexing resistance of 8 mmφ or less, 5 mmφ or less, 2-8 mmφ, 2-5 mmφ, or 2-3 mmφ.

Herein, the flexing resistance of the dry electrode may be evaluated according to the method of the test standard JIS K5600-5-1 as mentioned above.

According to an embodiment of the present disclosure, the flexing resistance of the dry electrode may be evaluated by the method including the steps of:

preparing a rectangular electrode sample having a size of 100 mm×50 mm;

preparing test rods each having a diameter of 2, 3, 4, 5, 6, 8, 10, 12, 16, 20, 25 or 32 mm, allowing the electrode sample to be in contact with the test rod by using the test rod having the largest diameter, and judging whether the mixture film of the electrode sample cracks or not, when both ends of the electrode sample are lifted; and repeating the step of judging whether the mixture film of the electrode sample cracks or not in the same manner as the preceding step by using the test rod having the second largest diameter, when no cracking occurs in the preceding step, and then determining the minimum diameter value of the test rod by which no cracking occurs in the mixture film of the electrode sample as the flexing resistance.

For example, in the case of a dry electrode sample which does not crack in the mixture film of the dry electrode sample, when it is allowed to be in contact with test rods having a diameter ranging from 32 mm to 3 mm and both ends of the electrode sample are lifted, but cracks in the mixture film of the electrode sample, when it is allowed to be in contact with a test rod having a diameter of 2 mm and both ends of the electrode sample are lifted, the flexing resistance of the dry electrode sample is determined as the minimum diameter value (i.e. 3 mmφ) of the test rods causing no cracking in the mixture film of the electrode sample.

According to an embodiment of the present disclosure, the mixture film may have a porosity of 20-35%, 22-30%, 20-28%, 20-26%, 23.1-27.4%, 23.1-24.8%, or 24.8-27.4%. The method for evaluating the porosity is the same as described above.

According to an embodiment of the present disclosure, the active material loading amount of the mixture film may be 3-15 mAh/cm², particularly 4-10 mAh/cm², 4-6 mAh/cm², 4-5 mAh/cm², or 4.8-4.9 mAh/cm². The method for evaluating the active material loading amount is the same as described above.

The interfacial resistance between the mixture film and the current collector may be 5 Ω·cm² or less, 4.3 Ω·cm² or less, 4 Ω·cm² or less, 3 Ω·cm² or less, 1.3-4.3 Ω·cm², 1.3-1.8 Ω·cm², or 1.8-4.3 Ω·cm². The method for evaluating the interfacial resistance is the same as described above.

In still another aspect of the present disclosure, there are provided a secondary battery including the dry electrode as described above, wherein the dry electrode is a positive electrode, and an electrode assembly including the positive electrode, a negative electrode and a separator is received in a battery casing together with a lithium-containing non-aqueous electrolyte, and an energy storage apparatus including the secondary battery as a unit cell.

Herein, the structure of the secondary battery and that of the energy storage apparatus are known to those skilled in the art, and thus detailed description thereof will be omitted herein.

In yet another aspect of the present disclosure, there is provided an apparatus for manufacturing a dry electrode, including: a blender configured to blend mixture ingredients including an active material, a conductive material and a binder; a kneader configured to prepare mixture lumps by kneading the blended mixture; a pulverizer configured to pulverize the mixture lumps to form powder for an electrode; a calender configured to form the powder for an electrode into a mixture film; and a lamination roll configured to dispose the mixture film on at least one surface of a current collector and to carry out lamination.

The blender is a mixing device configured to mix the ingredients, and can mix the ingredients of the mixture at a rate of 5,000-20,000 rpm, as described above.

The kneader is a binder fibrilization device used instead of jet-milling according to the present disclosure, and the mixture can be obtained in the form of mixture lumps through the kneading in the kneader.

Herein, according to the present disclosure, the kneader is set under the condition of a temperature of 70-200° C. and a pressure equal to or higher than ambient pressure. Particularly, the kneader may be set under the condition of a temperature of 90-180° C. or 90-150° C., and a pressure of 1-60 atm, 1-30 atm, 1-10 atm, 1-3 atm, or 1.1-3 atm.

The pulverizer is a device configured to pulverize the mixture lumps to form powder for an electrode, and a blender may also be used as a pulverizer, or a grinder, such as a cutter mill or a fine impact mill, may be used.

The calender is a device configured to forming the powder for an electrode into a film shape. For example, the calender may be a pair of rollers facing each other, and the film thickness may be controlled by using the gap between the rollers.

The lamination roll functions to attach and press the mixture film formed by the calender to at least one surface of the current collector.

In other words, the apparatus for manufacturing a dry electrode according to the present disclosure is characterized in that it does not include any jet-milling instrument but includes a kneader and a pulverizer.

The structure of each of the blender, the calender and the lamination roll is known to those skilled in the art, and thus detailed description thereof will be omitted herein.

Mode for Disclosure

Hereinafter, the present disclosure will be explained in detail with reference to Examples, Comparative Examples and Test Examples so that the present disclosure will fully convey the scope of the present disclosure to those skilled in the art.

Example 1

First, 94 g of $LiMnO_2$ as a positive electrode active material, 0.5 g of activated carbon and 3 g of carbon black as conductive materials, and 2.5 g of polytetrafluoroethylene (PTFE) as a binder were introduced to a blender and mixed therein at 15,000 rpm for 1 minute to prepare a mixture. A kneader is stabilized at a temperature of 90° C., the mixture was introduced to the kneader, and then the kneader was operated under a pressure of 1.1 atm at a speed of 50 rpm for 5 minutes to obtain mixture lumps.

The mixture lumps were introduced to a blender and pulverized therein at 10,000 rpm for 1 minute to obtain powder for an electrode.

Comparative Example 1

Powder for an electrode was obtained in the same manner as Example 1, except that the mixture was directly subjected to a jet-milling process (feeding pressure 50 psi, grinding pressure 45 psi), while not being subjected to the kneading step using a kneader and the pulverization step.

Test Example 1

Figure 3:
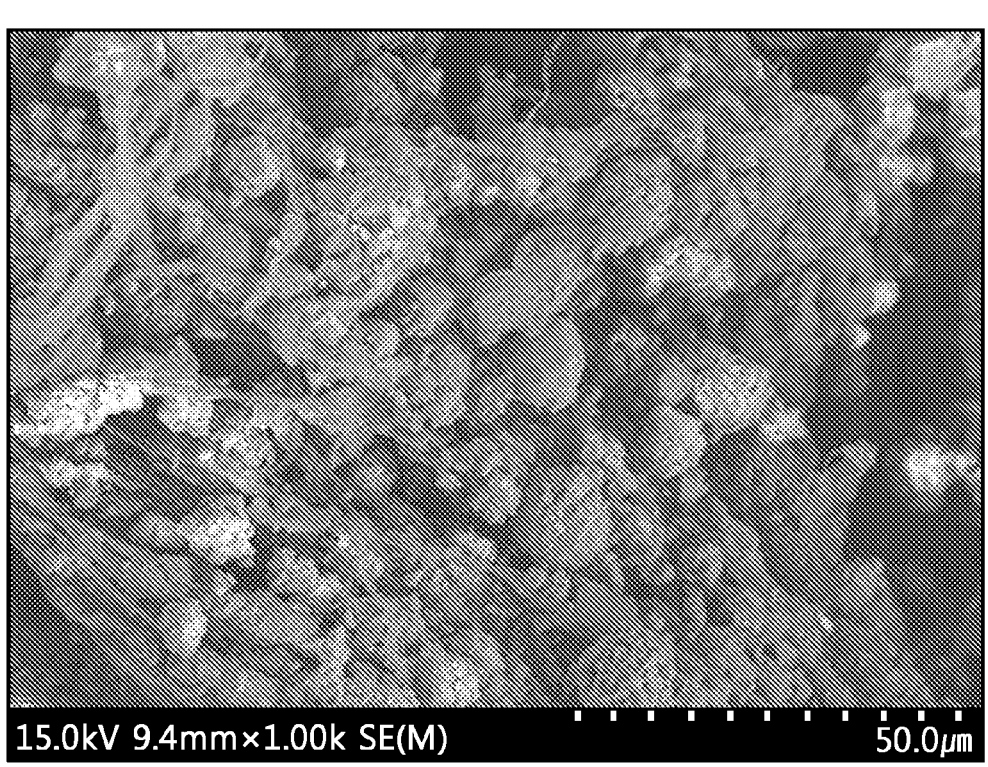
FIG. 3 is a scanning electron microscopic (SEM) image illustrating the powder for an electrode of Example 1 according to Test Example 1 of the present disclosure.
Figure 4:
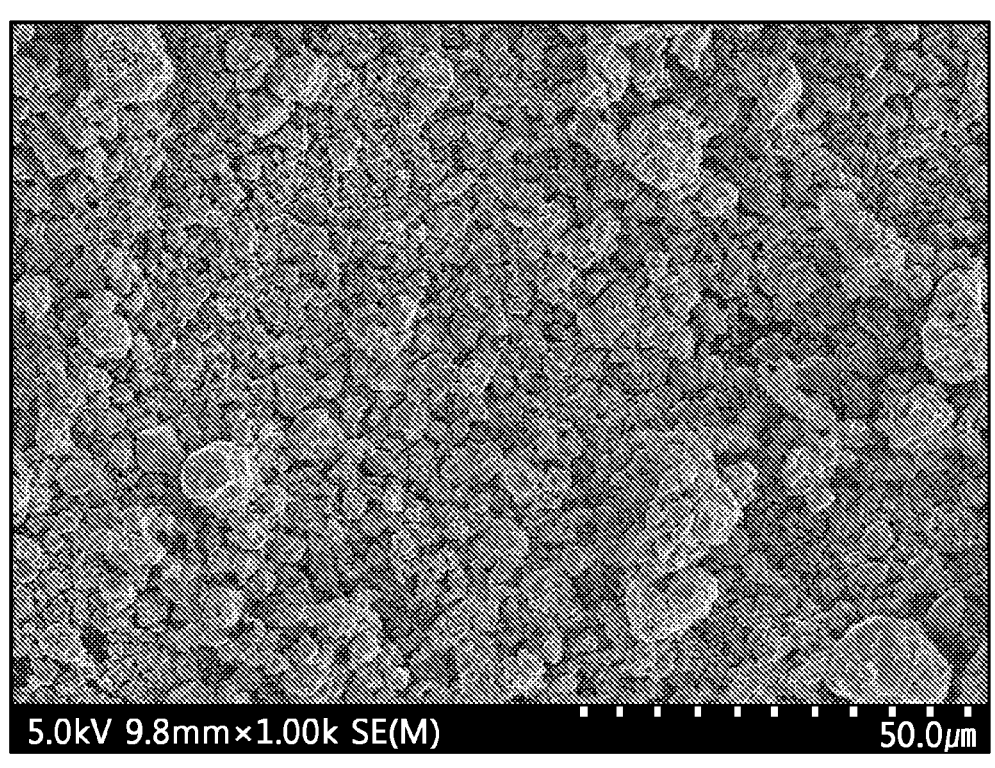
FIG. 4 is an SEM image illustrating the powder for an electrode of Comparative Example 1 according to Test Example 1 of the present disclosure.

FIG. 3 and FIG. 4 are scanning electron microscopic (SEM) images of the powder for an electrode according to Example 1 and the powder for an electrode according to Comparative Example 1, respectively.

Referring to FIG. 3 and FIG. 4, it can be seen how the active material is micronized.

It can be seen that the dry electrode according to Comparative Example 1 shows a higher degree of micronization.

Example 2

Powder for an electrode was obtained in the same manner as Example 1, except that the kneader was set to a temperature of 150° C.

Example 3

Powder for an electrode was obtained in the same manner as Example 1, except that 3.5 g of carbon black was used alone as a conductive material, and the kneader was set to a temperature of 150° C.

Comparative Example 2

Powder for an electrode was obtained in the same manner as Example 1, except that the kneader was set to a temperature of 25° C.

Comparative Example 3

Powder for an electrode was obtained in the same manner as Example 1, except that the kneader was set to a temperature of 60° C.

Test Example 2

The powder for an electrode prepared according to each of Examples 1-3 and Comparative Examples 1-3 was determined in terms of the resistivity under pressurization as follows. The results are shown in the following Table 1.

Resistivity under pressurization of powder for electrode: The resistivity was calculated by introducing 2 g of the powder for an electrode to a ceramic container having a diameter of 22 mm and including a 4-point probe embedded in the bottom thereof, measuring resistance after applying a force of 2000 kgf, i.e. after pressurizing the powder for an electrode under a pressure of about 50 MPa, and multiplying the resistance by the thickness of the pressurized powder for an electrode.

Then, the powder for an electrode prepared according to each of Examples 1-3 and Comparative Examples 1-3 was introduced to a lab calender (roll diameter: 88 mm, roll temperature: 85° C., 20 rpm) under the following active material loading amount condition to obtain a mixture film. The mixture film was disposed on one surface of aluminum foil (19 μm) coated with a conductive primer layer containing carbon black and an acrylic binder mixed at a weight ratio of 5:6, and the resultant structure was laminated through lamination rolls maintained at a temperature of 120° C. to obtain an electrode.

Herein, the gap of the lamination rolls was controlled based on the initial density and thickness of the mixture film in such a manner that the porosity might fall within a target porosity ranging from 23% to 30%.

The obtained electrodes were determined in terms of the following parameters. Meanwhile, Comparative Examples 2 and 3 were evaluated about whether a mixture film could be obtained or not through a calender. The test methods were described hereinafter. The results are shown in Table 1.

Porosity: the actual porosity of each electrode was obtained by subtracting the volume and weight of the current collector from the volume and weight of the electrode to measure the apparent density of the mixture film alone, and calculating the porosity according to the following formula by using the actual density calculated based on the actual density and composition of each ingredient:

$$\text{Porosity } (\%) = \{1 - (\text{Apparent density/Actual density})\} \times 100$$

Flexing resistance: the flexing resistance was determined by the test standard as defined in JIS K5600-5-1 by allowing each electrode to be in contact with test rods having different diameters and lifting both ends to determine whether cracking occurs or not and to measure the minimum diameter with which no cracking occurs.

Particularly, the flexing resistance was evaluated by the method including the steps of: preparing a rectangular electrode sample having a size of 100 mm×50 mm; preparing test rods each having a diameter of 2, 3, 4, 5, 6, 8, 10, 12, 16, 20, 25 or 32 mm, allowing the electrode sample to be in contact with the test rod by using the test rod having the largest diameter, and judging whether the mixture film of the electrode sample cracks or not, when both ends of the electrode sample are lifted; and repeating the step of judging whether the mixture film of the electrode sample cracks or not in the same manner as the preceding step by using the test rod having the second largest diameter, when no cracking occurs in the preceding step, and then determining the minimum diameter value of the test rod by which no cracking occurs in the mixture film of the electrode sample as the flexing resistance.

For example, in the case of a dry electrode sample which had no cracking in the mixture film of the dry electrode sample, when it was allowed to be in contact with test rods having a diameter ranging from 32 mm to 3 mm and both ends of the electrode sample were lifted, but had cracking in the mixture film of the electrode sample, when it was allowed to be in contact with a test rod having a diameter of 2 mm and both ends of the electrode sample were lifted, the flexing resistance of the dry electrode sample was determined as the minimum diameter value (i.e. 3 mmφ) of the test rods causing no cracking in the mixture film of the electrode sample.

Interfacial resistance between mixture film and current collector: the interfacial resistance was obtained through the multi-probe (MP) resistance measurement by applying an electric current of 100 μA to the electrode and calculating the resistance value between the mixture film and the current collector layer as a potential difference measured among the 46 probes.

TABLE 1

| | Carbonaceous materials (activated carbon:carbon black) | Kneader temperature (° C.) | Powder resistivity (Ω · cm) | Film formation | Loading amount (mAh/cm$^2$) | Porosity (%) | Electrode interfacial resistance (Ω · cm$^2$) | Flexing resistance (Φ) |
|---|---|---|---|---|---|---|---|---|
| Ex. 1 | 0.5:3 (weight ratio) | 90 | 334 | ○ | 4.8 | 24.8 | 1.3 | 2 |
| Ex. 2 | 0.5:3 (weight ratio) | 150 | 662 | ○ | 4.9 | 27.4 | 4.3 | 2 |
| Ex. 3 | 0:3.5 (weight ratio) | 150 | 459 | ○ | 4.8 | 23.1 | 1.8 | 3 |
| Comp. Ex. 1 | 0.5:3 (weight ratio) | — | 780 | ○ | 4.8 | 24.7 | 5.6 | 10 |
| Comp. Ex. 2 | 0.5:3 (weight ratio) | 25 | 250 | X | — | — | — | — |
| Comp. Ex. 3 | 0.5:3 (weight ratio) | 60 | 345 | X | — | — | — | — |

Referring to Table 1, it can be seen that the dry electrode according to the present disclosure shows a flexing resistance of 3 lump or less. However, the dry electrode according to the related art shows a flexing resistance of 10 lump. In addition, when the kneader temperature is low, filming cannot be performed with ease under the calendering condition. Therefore, it can be seen that such a low kneader temperature is not suitable for a process for manufacturing an electrode.

Test Example 3

Lithium metal was deposited on copper foil to a thickness of 70 μm to obtain a negative electrode.

A polyethylene membrane (Celgard, thickness: 20 μm) was interposed between the negative electrode and the dry electrode according to each of Examples 1-3 and Comparative Example 1 to form an electrode assembly.

The electrode assembly was received in a battery casing, and a liquid electrolyte including 1 M LiPF$_6$ dissolved in a mixed solvent containing ethylene carbonate, dimethylene carbonate and diethyl carbonate at a volume ratio of 1:2:1, followed by sealing, to obtain a secondary battery.

The secondary battery was charged at 0.1 C to 4.3 V in a constant current (CC)-constant voltage (CV) mode, and then discharged at 0.1 C to 3.0 V, and the charge capacity, discharge capacity and efficiency were calculated. The results are shown in the following Table 2.

TABLE 2

| | Charge capacity (mAh/g) | Discharge capacity (mAh/g) | Efficiency (%) |
|---|---|---|---|
| Ex. 1 | 103.2 | 104.8 | 98.50 |
| Ex. 2 | 103.6 | 105.1 | 98.53 |
| Ex. 3 | 105.0 | 106.4 | 98.65 |
| Comp. Ex. 1 | 103.8 | 105.4 | 98.47 |

Referring to Table 2, it can be seen that the secondary battery obtained by the method according to the present disclosure shows a charge/discharge efficiency similar to or higher than the secondary battery according to the related art.

What is claimed is:

1. A dry electrode comprising:
a current collector; and
a dry mixture film laminated on the current collector,
wherein the dry electrode comprises an active material, a conductive material and a fibrillized binder, and has a flexing resistance of 2-8 mmφ,
wherein the fibrillized binder is interconnected to particles of the active material and the conductive material,
wherein the dry mixture film has a porosity of 20-35%,
wherein the interfacial resistance between the dry mixture film and the current collector is 5 Ω·cm$^2$ or less, and
wherein the current collector is partially or totally coated with a conductive primer.

2. The dry electrode according to claim 1, wherein the flexing resistance of the dry electrode is evaluated according to a test standard JIS K5600-5-1.

3. The dry electrode according to claim 2, wherein the flexing resistance of the dry electrode is evaluated by a method comprising:
preparing a rectangular electrode sample having a size of 100 mm×50 mm;
preparing test rods each having a diameter of 2, 3, 4, 5, 6, 8, 10, 12, 16, 20, 25 or 32 mm, allowing an electrode sample to be in contact with the test rod by using the test rod having a largest diameter, and judging whether the dry mixture film of the electrode sample cracks or not, when both ends of the electrode sample are lifted; and
repeating the judging of whether the dry mixture film of the electrode sample cracks or not in the same manner as the preceding judging by using the test rod having a second largest diameter, when no cracking occurs in the preceding judging, and then determining a minimum diameter value of the test rod by which no cracking occurs in the dry mixture film of the electrode sample as the flexing resistance.

4. The secondary battery comprising the dry electrode as defined in claim 1, wherein the secondary battery includes an electrode assembly, the electrode assembly comprising a positive electrode, a negative electrode and a separator,
wherein the dry electrode is the positive electrode,
wherein the electrode assembly is in a battery casing together with a lithium-containing non-aqueous electrolyte.

5. An energy storage apparatus comprising the secondary battery as defined in claim 4 as a unit cell.

* * * * *